(12) United States Patent
Miller (10) Patent No.: US 6,848,552 B2
(45) Date of Patent: Feb. 1, 2005

(54) STARTER PULLEY WITH INTEGRAL CLUTCH

(75) Inventor: John R. Miller, Jackson, MI (US)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/414,649

(22) Filed: Apr. 16, 2003

(65) Prior Publication Data

US 2004/0206594 A1 Oct. 21, 2004

(51) Int. Cl.[7] .............................................. F16D 23/00
(52) U.S. Cl. .................... 192/45; 192/104 R
(58) Field of Search .............................. 192/45, 103 R, 192/104 R, 105 R, 104 B, 104 C, 106 R; 74/6

(56) References Cited

U.S. PATENT DOCUMENTS

| | | | | |
|---|---|---|---|---|
| 4,178,805 A | * | 12/1979 | Mazzorana | 74/6 |
| 5,117,954 A | * | 6/1992 | Iga | 192/45 |
| 5,706,700 A | * | 1/1998 | Takagi et al. | 74/7 C |
| 5,740,694 A | * | 4/1998 | Nagao et al. | 74/7 E |
| 5,819,583 A | * | 10/1998 | Matsushima et al. | 74/7 E |
| 6,453,865 B2 | * | 9/2002 | Hirose et al. | 123/179.4 |

OTHER PUBLICATIONS

"PF–Series/Bearing Specification;" Miller Bearing Catalog; p. 16.
"Direct Pool Supplies;" Bearing for Swimming Pool Pumps; pp. 1–2.
Paul Weissler; "When Your Car Eats Belts;" Saturday Mechanic; Dec. 1998; pp. 1–4.
"FEAD (Front End Accessory Drive) Pulleys;" AJ Rose Manufacturing Co.; 1998–2000; p. 1.
Sushant Balsekar; "Battery Application—Starter Motor;" pp. 1–2.
"G109 Starter Motor;" Grob 109 Starter Motors; www. COMPILOTS.com—Aviation Portal; pp. 1–3.

* cited by examiner

Primary Examiner—Saul Rodriguez
(74) Attorney, Agent, or Firm—Warn, Hoffmann, Miller & Lalone, P.C.

(57) ABSTRACT

Starter motor systems are described, wherein the systems include a unidirectional clutch system that cooperates with a pulley system to start an internal combustion engine through the front-end accessory drive system. The starter motor systems are especially well suited for new, high fuel efficiency automobiles in which the engine is shut down (e.g., when the automobile stops) and subsequently started (e.g., when the accelerator pedal is depressed).

82 Claims, 6 Drawing Sheets

STARTER PULLEY WITH INTEGRAL CLUTCH

FIELD OF THE INVENTION

The present invention relates generally to a vehicle starter motor and more particularly to a new and improved unidirectional (i.e., one-way) clutch system for use with a drive pulley of a vehicle starter motor system.

BACKGROUND OF THE INVENTION

Presently, conventional starter motor systems for automotive applications typically employ an electric starter motor with a Bendix-drive pinion gear to drive a relatively large diameter ring gear attached to the engine crankshaft. This particular type of system usually rotates the engine too slowly to prevent an undesirable delay in the engine start-up process. Additionally, these conventional starter motor systems produce substantial noise levels that could be objectionable with high-frequency usage. Furthermore, the high frequency of use may cause durability problems with these conventional gear driven systems, thus leading to failure of the components of the starter motor system with resulting warranty claims.

The aforementioned problems with conventional starter motor systems is a special concern to manufacturers of new, high fuel-efficiency automotive models that employ engine control systems for shutting down the engine during certain operating conditions, for example, typically when the automobile is either stopped and/or idling. The engine is then typically started back up when either the accelerator is depressed and/or the brake is released (e.g., when moving from a stopped and/or braked position). This type of mechanism is generally referred to as an "idle-stop" system and is typically found in certain gasoline or diesel automotive vehicles. If a conventional starter motor system were to be employed in such an automobile, the wear on the individual components of the starter motor system, especially the pinion gear and the ring gear, would be rather excessive and would possibly lead to increased mechanical failures of the system.

Therefore, there exists a need for a new and improved starter motor system, wherein the starter motor system is selectively engaged when either the accelerator of an automotive is depressed and/or the brake is released and selectively disengaged when either the automotive is stopped and/or idling.

SUMMARY OF THE INVENTION

In accordance with the general teachings of the present invention, new and improved starter motor systems are provided. These starter motor systems of the present invention are especially suitable for use with idle-stop engine control systems, such as those found in gasoline or diesel automotive vehicles.

The starter motor systems of the present invention are preferably selectively engaged when the accelerator of an automobile is first depressed and selectively disengaged when the automobile is stopped and/or idling. To accomplish this, the present invention preferably employs a unidirectional clutch system that is preferably integrated with at least one pulley drive system to start an internal combustion engine, preferably through the front-end accessory drive (FEAD) pulley drive system. In this manner, the present invention is highly suitable for use with current and future high fuel economy vehicles in which the engine stops when the vehicle stops, for example, and starts when the accelerator pedal is depressed, for example.

More specifically, the present invention preferably employs a one-way roller clutch system that is preferably integrated into a pulley drive system (e.g., a multi-groove pulley). The FEAD pulley system is rotatably mounted directly to an electric starter motor. This combined system is preferably mounted on the front of the engine, in series with (e.g., co-planar) the other front-end accessories, such as but not limited to the alternator and water pump systems. By selecting the proper starter motor/crankshaft pulley drive ratio (approximately 3:1), the engine can be cranked at a high enough speed to ensure rapid starting with relatively low noise levels. The roller clutch mechanism preferably includes at least a selectively rotatable inner race, a selectively rotatable outer race having a series of depressions formed on an interior surface thereof, a series of biasable members disposed in the depressions, and a series of rollers disposed between the inner and outer races in proximity to the depressions and held in place by the biasable members. The design of the roller clutch system is such that when the engine is running, the centrifugal force exerted of the rollers overcomes the spring plate force of the biasable members and the rollers move down, or further into, the depressions (e.g., ramps), which are angled, and out of contact with the inner race. This helps to minimize the wear and heat build up that would be present if the rollers were allowed to remain in contact with the inner race of the roller clutch system at all times.

In accordance with a first embodiment of the present invention, a clutch system for use with a starter motor system having a selectively rotatable shaft member is provided, comprising: (1) an inner race member being coaxially disposed about, and in selective physical cooperation with, the selectively rotatable shaft member, the inner race member being capable of rotating in response to a torque force transmitted from the selectively rotatable shaft member; (2) an outer race member being coaxially disposed about, and in selective physical cooperation with, the inner race member, the outer race member being capable of rotating in response to a torque force transmitted from the inner race member; and (3) at least one roller member disposed between the inner and outer race members. The at least one roller member is selectively operable so as to physically engage at least a portion of a surface of the outer and inner race members so as to cause a torque force from the inner race member to be transmitted to the outer race member. The at least one roller member is selectively operable so as to physically disengage from at least a portion of the surface of the inner race member so as to prevent a torque force from the outer race member to be transmitted to the inner race member.

In accordance with a second embodiment of the present invention, a clutch system for use with a starter motor system having a selectively rotatable shaft member is provided, comprising: (1) an inner race member being coaxially disposed about, and in selective physical cooperation with, the selectively rotatable shaft member, the inner race member being capable of rotating in response to a torque force transmitted from the selectively rotatable shaft member; (2) an outer race member being coaxially disposed about, and in selective physical cooperation with, the inner race member, the outer race member being capable of rotating in response to a torque force transmitted from the inner race member; (3) at least one biasable member in physical cooperation with at least a surface of the outer race member; and (4) at least one roller member disposed between the inner and outer race members, the at least one roller member in physical cooperation with the at least one biasable member. The at least one roller member is selectively operable so as to physically engage at least a portion of a surface of the outer and inner race members so as to cause a torque force from the inner race member to be transmitted to the outer race member. The at least one roller member is capable of transmitting a compressive force to the at least one biasable member so as to cause the at least one roller member to physically disengage from at least a portion of the surface of the inner race member so as to prevent a torque force from the outer race member to be transmitted to the inner race member.

In accordance with a third embodiment of the present invention, a clutch system for use with a starter motor system having a selectively rotatable shaft member is provided, comprising: (1) an inner race member being coaxially disposed about, and in selective physical cooperation with, the selectively rotatable shaft member, the inner race member being capable of rotating in response to a torque force transmitted from the selectively rotatable shaft member; (2) an outer race member being coaxially disposed about, and in selective physical cooperation with, the inner race member, the outer race member being capable of rotating in response to a torque force transmitted from the inner race member, the outer race having at least one area defining a depression formed on an interior surface thereof; (3) at least one biasable member in physical cooperation with at least a portion of a surface of the depression; and (4) at least one roller member disposed between the inner and outer race members, the at least one roller member in physical cooperation with the at least one biasable member. The at least one roller member is selectively operable so as to physically engage at least a portion of a surface of the outer and inner race members so as to cause a torque force from the inner race member to be transmitted to the outer race member. The at least one roller member is capable of transmitting a compressive force to the at least one biasable member so as to cause the at least one roller member to physically disengage from at least a portion of the surface of the inner race member so as to prevent a torque force from the outer race member to be transmitted to the inner race member.

In accordance with a fourth embodiment of the present invention, a starter motor system is provided, comprising: (1) a starter motor having a selectively rotatable shaft member; and (2) a clutch system, comprising: (a) an inner race member being coaxially disposed about, and in selective physical cooperation with, the selectively rotatable shaft member, the inner race member being capable of rotating in response to a torque force transmitted from the selectively rotatable shaft member; (b) an outer race member being coaxially disposed about, and in selective physical cooperation with, the inner race member, the outer race member being capable of rotating in response to a torque force transmitted from the inner race member; and (c) at least one roller member disposed between the inner and outer race members. The at least one roller member is selectively operable so as to physically engage at least a portion of a surface of the outer and inner race members so as to cause a torque force from the inner race member to be transmitted to the outer race member. The at least one roller member is selectively operable so as to physically disengage from at least a portion of the surface of the inner race member so as to prevent a torque force from the outer race member to be transmitted to the inner race member.

In accordance with a fifth embodiment of the present invention, a starter motor system is provided, comprising: (1) a starter motor having a selectively rotatable shaft member; and (2) a clutch system, comprising: (a) an inner race member being coaxially disposed about, and in selective physical cooperation with, the selectively rotatable shaft member, the inner race member being capable of rotating in response to a torque force transmitted from the selectively rotatable shaft member; (b) an outer race member being coaxially disposed about, and in selective physical cooperation with, the inner race member, the outer race member being capable of rotating in response to a torque force transmitted from the inner race member; (c) at least one biasable member in physical cooperation with at least a surface of the outer race member; and (d) at least one roller member disposed between the inner and outer race members, the at least one roller member in physical cooperation with the at least one biasable member. The at least one roller member is selectively operable so as to physically engage at least a portion of a surface of the outer and inner race members so as to cause a torque force from the inner race member to be transmitted to the outer race member. The at least one roller member is capable of transmitting a compressive force to the at least one biasable member so as to cause the at least one roller member to physically disengage from at least a portion of the surface of the inner race member so as to prevent a torque force from the outer race member to be transmitted to the inner race member.

In accordance with a sixth embodiment of the present invention, a starter motor system is provided, comprising: (1) a starter motor having a selectively rotatable shaft member; and (2) a clutch system, comprising: (a) an inner race member being coaxially disposed about, and in selective physical cooperation with, the selectively rotatable shaft member, the inner race member being capable of rotating in response to a torque force transmitted from the selectively rotatable shaft member; (b) an outer race member being coaxially disposed about, and in selective physical cooperation with, the inner race member, the outer race member being capable of rotating in response to a torque force transmitted from the inner race member, the outer race having at least one area defining a depression formed on an interior surface thereof; (c) at least one biasable member in physical cooperation with at least a portion of a surface of the depression; and (d) at least one roller member disposed between the inner and outer race members, the at least one roller member in physical cooperation with the at least one biasable member. The at least one roller member is selectively operable so as to physically engage at least a portion of a surface of the outer and inner race members so as to cause a torque force from the inner race member to be transmitted to the outer race member. The at least one roller member is capable of transmitting a compressive force to the at least one biasable member so as to cause the at least one roller member to physically disengage from at least a portion of the surface of the inner race member so as to prevent a torque force from the outer race member to be transmitted to the inner race member.

In accordance with a seventh embodiment of the present invention, an engine system is provided, comprising: (1) an engine having a selectively rotatable crankshaft member; (2) a selectively rotatable pulley drive system in physical cooperation with the engine; (3) a belt member in physical cooperation with the pulley drive system, the pulley drive system capable of transmitting a torque force to the belt member so as to cause the crankshaft member to rotate; (4) a starter motor having a selectively rotatable shaft member;

and (5) a clutch system, comprising: (a) an inner race member being coaxially disposed about, and in selective physical cooperation with, the selectively rotatable shaft member, the inner race member being capable of rotating in response to a torque force transmitted from the selectively rotatable shaft member; (b) an outer race member being coaxially disposed about, and in selective physical cooperation with, the inner race member, the outer race member being capable of rotating in response to a torque force transmitted from the inner race member, the outer race member in physical cooperation with the pulley drive system, the outer race member capable of transmitting a torque force to the pulley drive system; and (c) at least one roller member disposed between the inner and outer race members. The at least one roller member is selectively operable so as to physically engage at least a portion of a surface of the outer and inner race members so as to cause a torque force from the inner race member to be transmitted to the outer race member. The at least one roller member is selectively operable so as to physically disengage from at least a portion of the surface of the inner race member so as to prevent a torque force from the outer race member to be transmitted to the inner race member.

In accordance with an eighth embodiment of the present invention, an engine system is provided, comprising: (1) an engine having a selectively rotatable crankshaft member; (2) a selectively rotatable pulley drive system in physical cooperation with the engine; (3) a belt member in physical cooperation with the pulley drive system, the pulley drive system capable of transmitting a torque force to the belt member so as to cause the crankshaft member to rotate; (4) a starter motor having a selectively rotatable shaft member; and (5) a clutch system, comprising: (a) an inner race member being coaxially disposed about, and in selective physical cooperation with, the selectively rotatable shaft member, the inner race member being capable of rotating in response to a torque force transmitted from the selectively rotatable shaft member; (b) an outer race member being coaxially disposed about, and in selective physical cooperation with, the inner race member, the outer race member being capable of rotating in response to a torque force transmitted from the inner race member, the outer race member in physical cooperation with the pulley drive system, the outer race member capable of transmitting a torque force to the pulley drive system; (c) at least one biasable member in physical cooperation with at least a surface of the outer race member; and (d) at least one roller member disposed between the inner and outer race members, the at least one roller member in physical cooperation with the at least one biasable member. The at least one roller member is selectively operable so as to physically engage at least a portion of a surface of the outer and inner race members so as to cause a torque force from the inner race member to be transmitted to the outer race member. The at least one roller member is capable of transmitting a compressive force to the at least one biasable member so as to cause the at least one roller member to physically disengage from at least a portion of the surface of the inner race member so as to prevent a torque force from the outer race member to be transmitted to the inner race member.

In accordance with a ninth embodiment of the present invention, an engine system is provided, comprising: (1) an engine having a selectively rotatable crankshaft member; (2) a selectively rotatable pulley drive system in physical cooperation with the engine; (3) a belt member in physical cooperation with the pulley drive system, the pulley drive system capable of transmitting a torque force to the belt member so as to cause the crankshaft member to rotate; (4) a starter motor having a selectively rotatable shaft member; and (5) a clutch system, comprising: (a) an inner race member being coaxially disposed about, and in selective physical cooperation with, the selectively rotatable shaft member, the inner race member being capable of rotating in response to a torque force transmitted from the selectively rotatable shaft member; (b) an outer race member being coaxially disposed about, and in selective physical cooperation with, the inner race member, the outer race member being capable of rotating in response to a torque force transmitted from the inner race member, the outer race having at least one area defining a depression formed on an interior surface thereof, the outer race member in physical cooperation with the pulley drive system, the outer race member capable of transmitting a torque force to the pulley drive system; (c) at least one biasable member in physical cooperation with at least a portion of a surface of the depression; and (d) at least one roller member disposed between the inner and outer race members, the at least one roller member in physical cooperation with the at least one biasable member. The at least one roller member is selectively operable so as to physically engage at least a portion of a surface of the outer and inner race members so as to cause a torque force from the inner race member to be transmitted to the outer race member. The at least one roller member is capable of transmitting a compressive force to the at least one biasable member so as to cause the at least one roller member to physically disengage from at least a portion of the surface of the inner race member so as to prevent a torque force from the outer race member to be transmitted to the inner race member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

The same reference numerals refer to the same parts throughout the various Figures.

DETAILED DESCRIPTION OF THE PREFERRED EMBODIMENTS

The following description of the preferred embodiment(s) is merely exemplary in nature and is in no way intended to limit the invention, its application, or uses.

Figure 1:
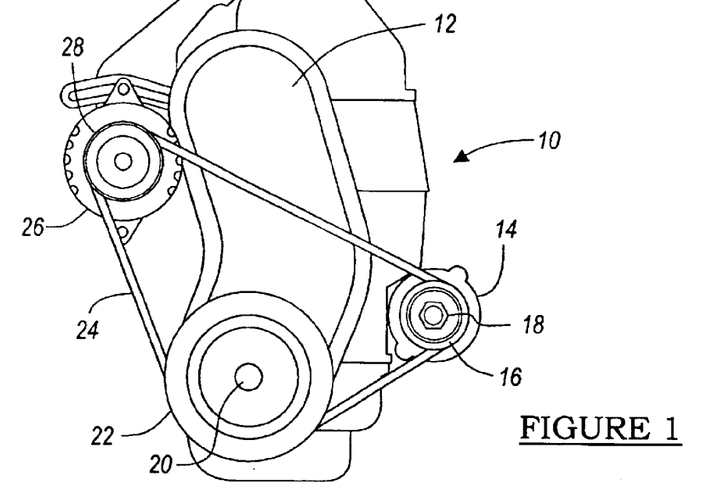
FIG. 1 illustrates a front schematic view of an engine system, in accordance with the general teachings of the present invention.
Figure 2:
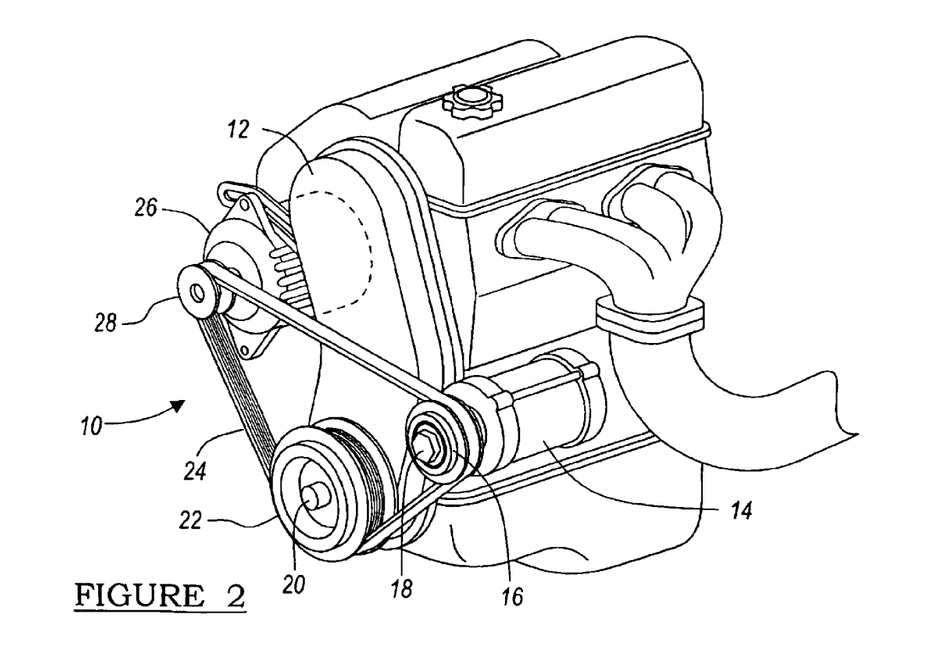
FIG. 2 illustrates a perspective schematic view of the engine system shown in FIG. 1, in accordance with the general teachings of the present invention.

Referring generally to the drawings, and specifically to FIGS. 1–2, there is shown an illustrative engine system 10, in accordance with the general teachings of the present invention. The engine system 10 of the present invention preferably includes, but is not limited to, an engine 12, a starter motor system 14, a selectively rotatable clutch system 16, a selectively rotatable front-end accessory drive system 18, a selectively rotatable crankshaft member 20, a selectively rotatable crankshaft drive system 22, a selectively rotatable drive belt member 24, an accessory system 26, and a selectively rotatable accessory drive system pulley 28.

The engine 12 is preferably an internal combustion engine, such as, but not limited to a gasoline or diesel engine. Furthermore, the engine 12 can be incorporated into high fuel efficiency automotive vehicles that utilize "idle-stop" engine control systems (not shown) that shut down the engine when the vehicle is stopped or idling and start up the engine when the accelerator pedal is depressed.

Figure 3:
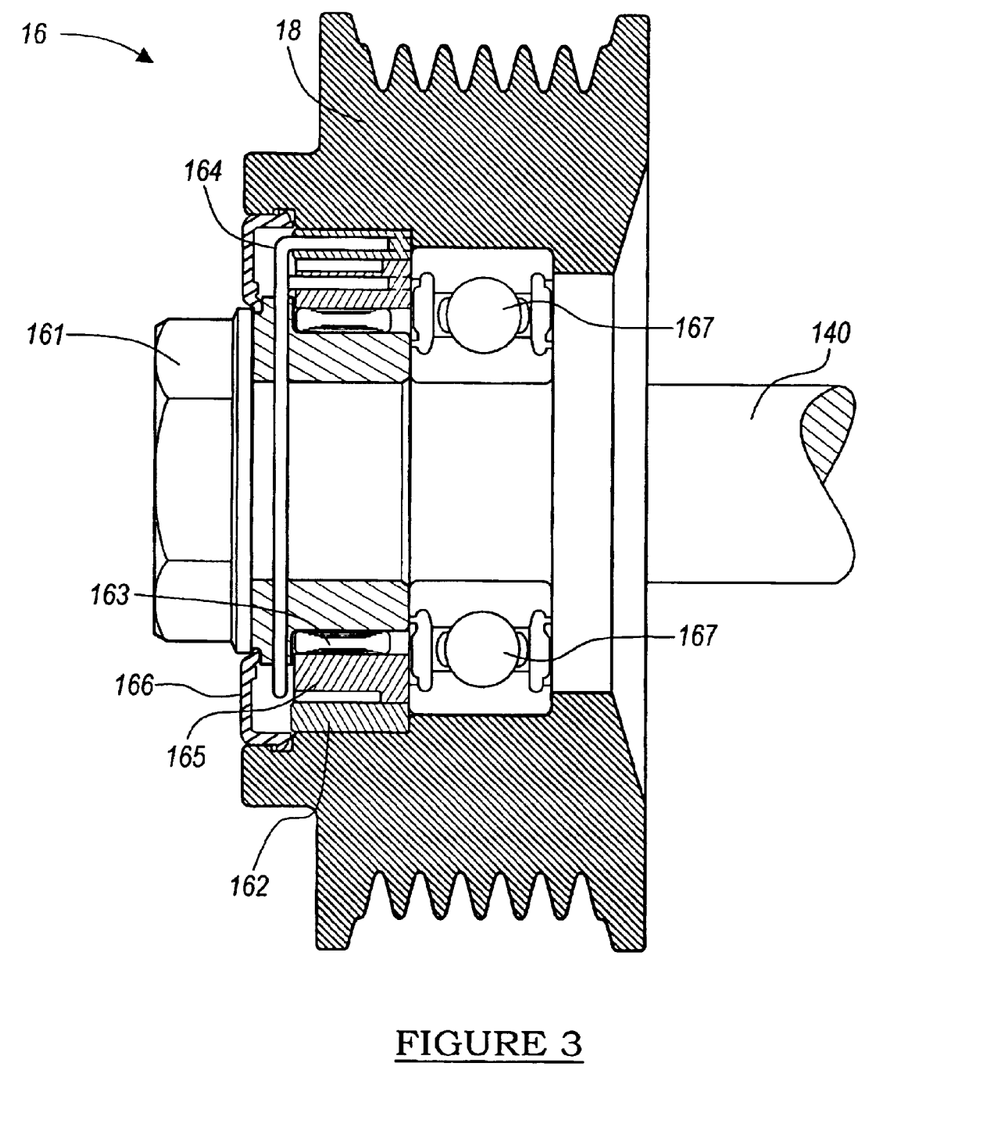
FIG. 3 illustrates a partial sectional view of a clutch system and front-end accessory drive system, in accordance with one embodiment of the present invention.
Figure 4:
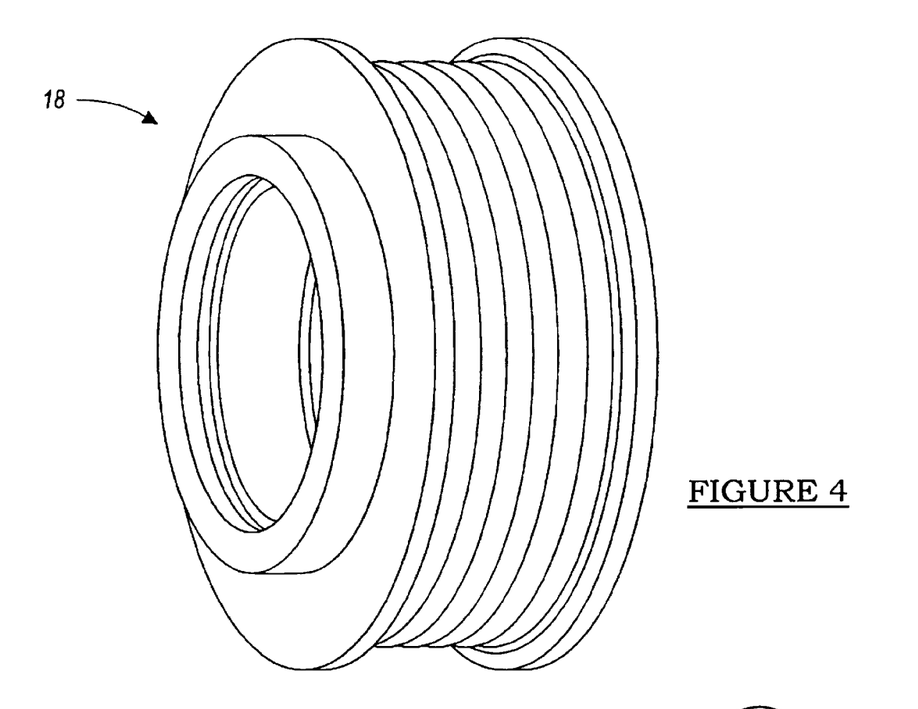
FIG. 4 illustrates a perspective view of a front end accessory drive system of the clutch system, in accordance with one embodiment of the present invention.

Without being bound to a theory of the operation of the present invention, it is intended that when the starter motor system 14 of FIG. 3 is energized (e.g., when the automobile's ignition system is activated), the selectively rotatable shaft member 140 of the starter motor system 14 will preferably begin to rotate. At that time, the clutch system 16, which is preferably coaxially disposed about the shaft member 140, will preferably be engaged, as described herein.

In accordance with one embodiment of the present invention, the clutch system 16, generally shown in FIGS. 3 and 5–10, preferably includes, but is not limited to the following components: (1) a selectively rotatable hub or inner race member 161; (2) a selectively rotatable outer race member 162; at least one roller member 163; a loop spring member 164; a retainer member 165; a seal member 166; and a bearing member 167.

Figure 5:
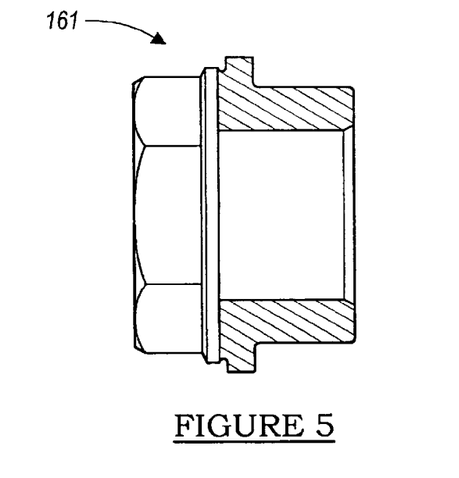
FIG. 5 illustrates a sectional view of an inner race member and optional nut member, in accordance with one embodiment of the present invention.

The inner race member 161, shown generally in FIG. 5, which is preferably coaxially disposed about the shaft member 18, can either be a separate component, or alternatively, it can be incorporated into an optional nut member that is intended to hold the front-end accessory drive system 18 onto the shaft member 140, as well as shield the clutch system 16 from the infiltration of water and contaminants. This step eliminates the need to spline the shaft member 18, because the inner race member 161 is locked to the shaft member 18 by the threaded connection.

In accordance with one embodiment of the present invention, the threads of the optional nut member are a left-hand design, thereby making the unit self-tightening during the start-up operation. In accordance with one embodiment of the present invention, the inner race member is preferably provided with a splined bore to allow torque to be transmitted from the shaft member 18 to the other components of the clutch system 16.

Figure 8:
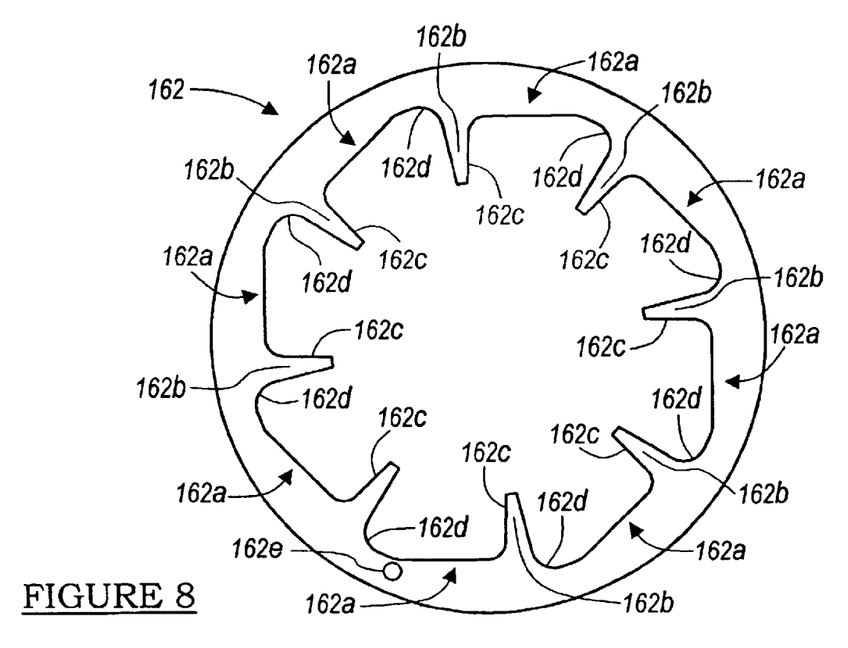
FIG. 8 illustrates a front view of an outer race member, in accordance with one embodiment of the present invention.
Figure 9:
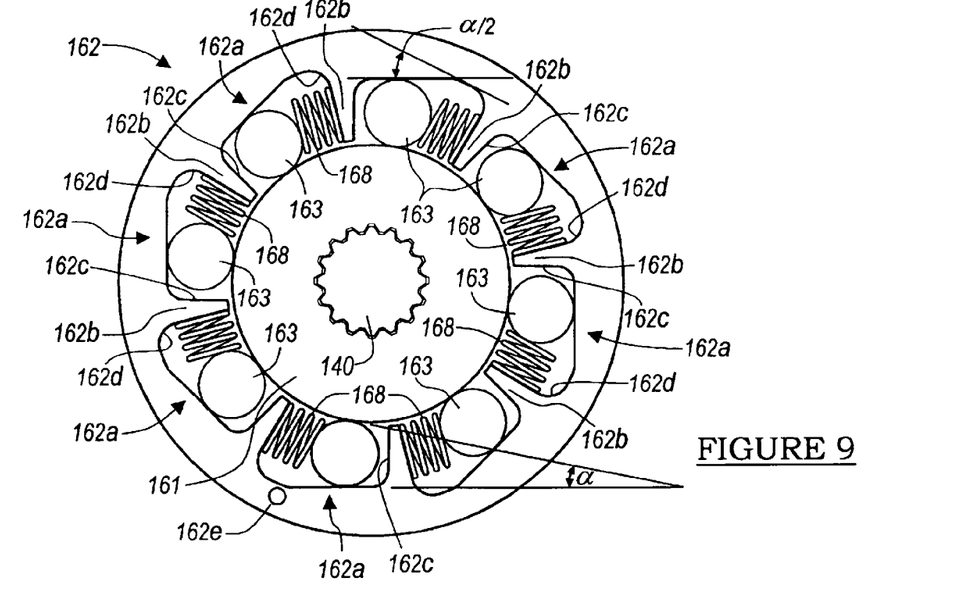
FIG. 9 illustrates a front view of an outer race member, inner race member, roller members, and biasable members in the engaged position, in accordance with one embodiment of the present invention.
Figure 10:
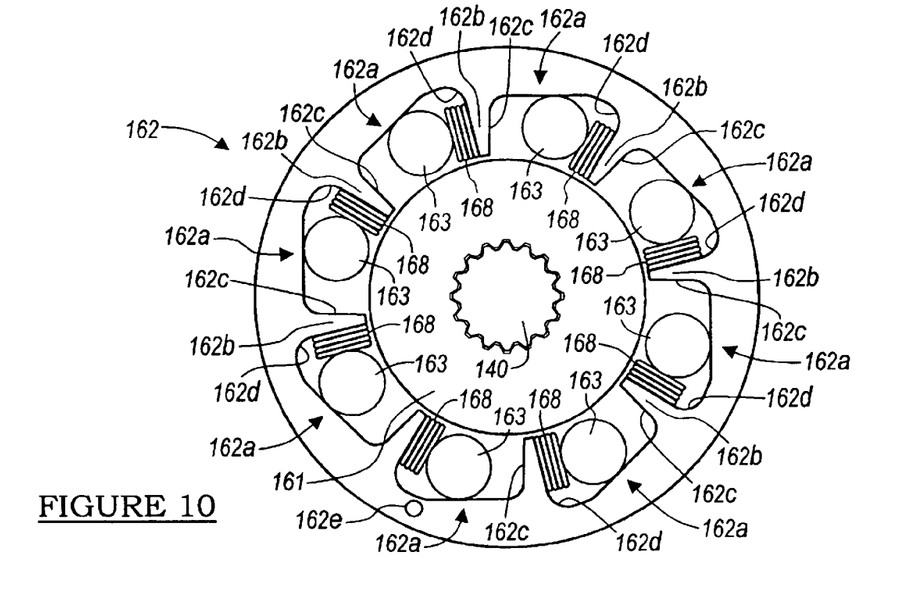
FIG. 10 illustrates a front view of an outer race member, inner race member, roller members, and biasable members in the disengaged position, in accordance with one embodiment of the present invention.

The outer race member 162, shown generally in FIGS. 8–10, which is preferably coaxially disposed about the inner race member 161, can either be integrated into the front-end accessory drive system 18 itself, or it can be made as a separate component. By way of a non-limiting example, the outer race member 162 can be keyed, pressed or formed integrally within the outer sheave surface of the front-end accessory drive system 18 so that the torque can be delivered to the front-end accessory drive system 18 when the clutch system 16 is engaged in the drive direction only. The outer race member 162 is preferably provided with an area defining an aperture 162E for accommodating one of the tines of the loop spring member 164.

The outer race member 162 is preferably provided with at least one depression, pocket or compartment 162A formed on an inner or interior surface thereon between arm members 162B that project radially in towards the center axis. The depression 162A preferably extends from the interior surface towards the exterior surface of the outer race member 162.

In accordance with one embodiment of the present invention, the depression 162A is preferably angled in such a manner that the depth of the depression 162A increases as the depression 162A extends toward the exterior surface of the outer race member 162. In this manner, the depression 162A consists substantially of two portions: a first portion 162C nearest the interior surface of the outer race member 162 having a first volume; and an angled second portion 162D nearer the exterior surface having a second volume that is larger than the first volume.

By way of a non-limiting example, at least one biasable member 168, shown generally in FIGS. 9–10, such as but not limited to a spring member, is in physical cooperation with at least a portion of a surface of the depression 162A, and more preferably, is in physical cooperation with at least a portion of a surface of the second portion 162D of the depression. Additionally, the biasable member 168 is in physical cooperation with the roller member 163, i.e., the biasable member 168 abuts or urges against the roller member 163 so as to keep the roller member 163 in selective contact with the exterior surface of the inner race member 161.

More specifically, the roller member 163 is positioned within each of the depressions 162A are constantly pushed by the biasable member 168 (e.g., accordion springs) into the engagement wedge angle a between the sloped outer surface of the second portion 162D and the tangent to the inner race member 161. Accordingly, it is preferred that the sloped outer surface of the second portion 162D must be chosen carefully to provide two major functions.

First, the wedge angle a is preferably maintained between 6–10° for optimum engagement performance and durability. By way of a non-limiting example, if the angle is too high, the roller members 163 will pop out of the depressions 162A too easily. By way of a non-limiting example, if the angle is too low, the resulting high hertzian contact stresses will brinnell and plastically deform the roller members 163 as well as the inner and outer race members, 161, 162, respectively.

Second, it is believed that the speed at which the roller members 163 disengage from the exterior surface of the inner race member 161 is preferably a function of the slope angle of the second portion 162D, the mass of the roller member 163, the radial distance between the roller member 163 and the front-end accessory drive system 18 axis and the spring force of the biasable member 168. In accordance with one embodiment of the present invention, the general formula for this relationship is $kx=\frac{1}{2} m(\omega^2 r)\sin(2\alpha)$, wherein k=the spring constant (force/unit length displacement); x=distance the biasable member 168 is compressed in the engaged position; m=roller member 163 mass; ω=rotating speed of the front-end accessory drive system 18; and r=radial distance from the front-end accessory drive system 18 centerline to the roller member 163 axis.

Without being bound to a particular theory of the present invention, centrifugal force will tend to throw the roller member 163 outwardly, reacting against the sloped surface of the depression 162A, especially the second portion of the depression 162D. By way of a non-limiting example, the angle between the sloped surface and a line perpendicular to a radial line through the center is actually one half the wedge of angle a. In accordance with a preferred embodiment of the present invention, this angle should be set so that the roller members 163 compress the biasable members 168 (e.g., accordion springs) and disengage just below engine idle speed, thus ensuring minimum roller member 163 contact and any subsequent wear at almost all operating conditions.

Figure 6:
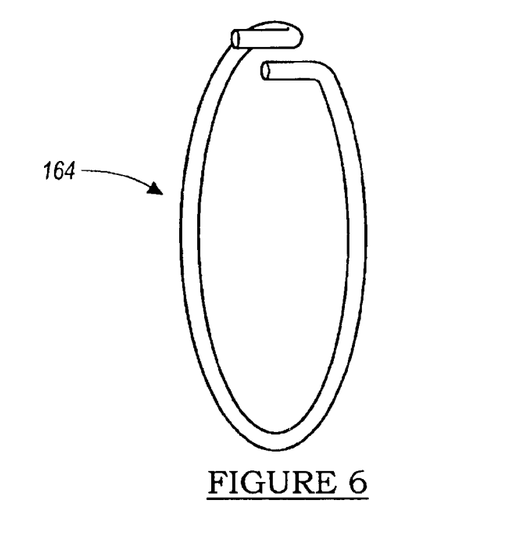
FIG. 6 illustrates a perspective view of a loop spring member, in accordance with one embodiment of the present invention.
Figure 7:
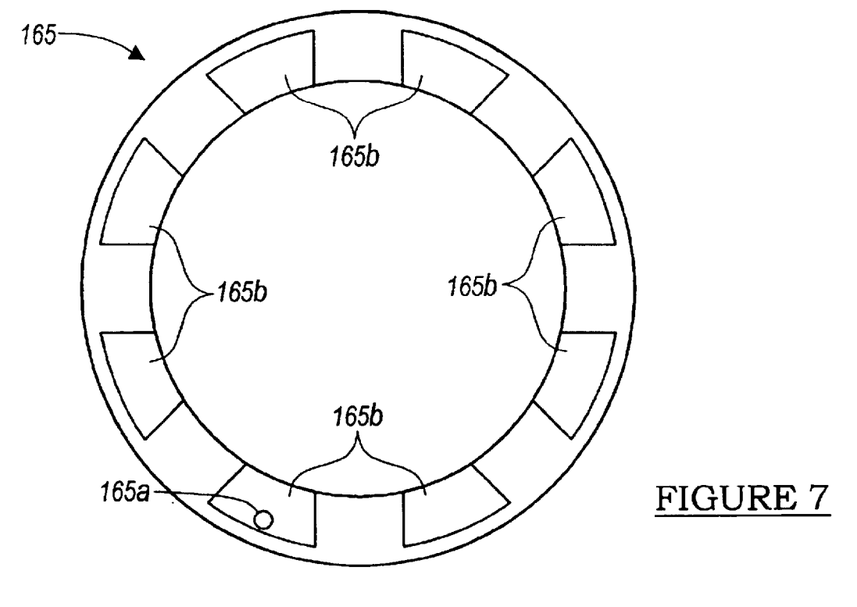
FIG. 7 illustrates a front view of a retainer member, in accordance with one embodiment of the present invention.

With respect to the intended function of the other components of the clutch system 16, the loop spring member 164, shown generally in FIG. 6, cooperates with both the outer race member 162 and the retainer member 165, the retainer member 165, shown generally in FIG. 7, preferably locks the bearing member 167 in place, the seal member 166, shown generally in FIG. 3, retains any lubricants within the clutch system 16, and the bearing member 167, shown generally in FIG. 3, preferably allows the front-end accessory drive system 18 to overrun the shaft member 140 after the automotive vehicle has started.

With respect to the actual operation of the clutch system 16 of the present invention, once the clutch system 16 is engaged, torque will be transmitted from the rotating shaft member 140 to the selectively rotatable inner race member 161 of the clutch system 16, which is coaxially disposed about the shaft member 140. To allow this torque to be transmitted, the inner race member 161 may be provided with a splined bore, or alternatively, may be fastened to or integrally formed with the shaft member 140.

The retainer member 165 is preferably provided with an area defining an aperture 165A for accommodating one of the tines of the loop spring member 164. In accordance with one embodiment of the present invention, the retainer member 165 is provided with at least one area defining a depression, pocket or compartment 165B to accommodate one or more roller members 163.

At least one roller member 163, in contact with both the inner race member 161 (e.g., the outer or exterior surface of the inner race member) and the selectively rotatable outer race member 162 (e.g., an inner or interior surface of the outer race member) of the clutch system 16, allows torque to be transmitted from the rotating inner race member 161 to the rotating outer race member 162. The outer race member 162 is preferably coaxially disposed about the inner race member 161.

As the outer race member 162 rotates, it transmits torque to the selectively rotatable front-end accessory drive system 18. The designation "front-end" is for illustrative purposes only, and is not meant to limit the structure, function, or placement of the particular drive system. By "drive system," as that phrase is used herein, it is meant any system that is capable of being driven by a member, device or system and/or any system that is capable of driving a member, device or system. The front-end accessory drive system 18 is preferably comprised of any type of selectively rotatable sheave, pulley, wheel or the like. Although a sheave is generally defined as a grooved pulley or wheel, the terms "sheave," "pulley," and "wheel" are being used interchangeably herein.

In accordance with one embodiment of the present invention, the selectively rotatable clutch system 16 is preferably rotatably mounted directly onto, or alternatively, in proximity to the starter motor system 14. Accordingly, as the outer race member 162 rotates, it transmits a torque force to the front-end accessory drive system 18, causing it in turn to rotate.

In accordance with one embodiment of the present invention, the drive belt member 24 is in physical cooperation with the front-end accessory drive system 18. By "drive belt member," as that phrase is used herein, it is meant any belt or chain drive member that is capable of driving another member, or alternatively, a belt or chain drive member capable of being driven by another member.

If the front-end accessory drive system 18 preferably consists of a sheave, i.e., a grooved pulley, the drive belt member 24 is preferably provided with a complementary grooved surface so as to provide good contact therewith. The belt member 24 preferably consists of a closed loop member, and can be comprised of any number or combination of materials, such as but not limited to metals, rubbers, plastics, or the like.

Accordingly, as the front-end accessory drive system 18 rotates, it imparts a torque force to the drive belt member 24, thus causing it to turn and rotate.

In accordance with one embodiment of the present invention, another portion of the drive belt member 24 is in physical cooperation with the selectively rotatable crankshaft drive system 22. The selectively rotatable crankshaft member 20 is in physical cooperation with the crankshaft drive system 22. The crankshaft member 20 is preferably fastened to the crankshaft drive system 22 so as to cause the crankshaft member 20 to simultaneously rotate when the crankshaft drive system 22 rotates. Preferably, the front-end accessory drive system 18 and the crankshaft drive system 22 are substantially co-planar.

As with the front-end accessory drive system 18, if the crankshaft drive system 22 consists of a sheave, i.e., a grooved pulley, the drive belt member 24 is preferably provided with a complementary grooved surface so as to provide good contact therewith.

Accordingly, as the front-end accessory drive system 18 rotates, the drive belt member 24 in turn rotates, thus causing the drive belt member 24 to transmit a torque force upon the crankshaft drive system 22 so as to cause it to rotate. As the crankshaft drive system 22 rotates, it then causes the crankshaft member 20 to rotate. This rotation of the crankshaft member 20 then causes the internal combustion process to commence, as is known in the art, and accordingly will not be discussed in detail herein.

However, modern engine systems typically employ numerous accessory systems that are necessary for the safe and efficient operation of the automotive vehicle. Illustrative examples of these accessory systems include, without limitation, alternator systems, power steering systems, air conditioner compressor systems, water-pump systems, air-pump systems, or the like.

In order to conserve or even eliminate the number of belt members that are needed to drive these various accessory systems, the present invention uses the belt member 24 to simultaneously drive the crankshaft drive system 22 and the selectively rotatable accessory drive system 28, thus actuating both the crankshaft member 20 and the accessory system 26. Although only one accessory system 26 and accessory drive system 28 are shown, it should be appreciated that several accessory systems and corresponding accessory drive systems are envisioned in accordance with the general teachings of the present invention. Preferably, the accessory drive system 28, the front-end accessory drive system 18 and the crankshaft drive system 22 are substantially co-planar with respect to one another.

Accordingly, in order to drive the accessory drive system 28, it is necessary to have the drive belt member 24 in physical cooperation with the accessory drive system 28. If the accessory drive system 28 consists of a sheave, i.e., a grooved pulley, the drive belt member 24 is preferably provided with a complementary grooved surface so as to provide good contact therewith.

Thus, as the crankshaft drive system 22 rotates, it transmits a torque force upon the drive belt member 24, thus causing it to rotate. As the drive belt member 24 rotates it transmits a torque force upon the accessory drive system 28, thus causing it to rotate, which in turn actuates (e.g., by rotation of an armature or shaft member) the accessory system 26.

Once the engine 12 cranks or "fires," the crankshaft drive system 22 "overruns" or rotates much more quickly than the starter motor system 14 (e.g., the shaft member 140), and thus it is no longer necessary for the starter motor system 14 to remain engaged, i.e., frictional engagement of the inner race member 161 and the outer race member 162 via the roller members 163. Accordingly, the clutch system 16 of the present invention provides a system for allowing the selective disengagement of the roller members 163 from the inner race member 161 so as to reduce any frictional damage caused by the roller members 163 remaining in contact with the inner race member 161.

Accordingly, the present invention takes advantage of the angled depression 162A and biasable members 168 of the outer race member 162. As the outer race member 162 rotates, a centrifugal force acts upon it causing the roller members 163 to exert a compressive force upon the biasable members 168. The compressive force causes the biasable members 168 to compress, thus allowing the roller members 163 to disengage from the exterior surface of the inner race member 161 and travel into, or alternatively, further into the depressions 162A.

As the centrifugal force continues, the roller members 163 travel further into the depressions 162A towards the angled second portions 162D having a relatively larger internal volume, thus ensuring that the roller members 163 cannot contact the exterior surface of the inner race member 161. Thus, while the outer race member 162 may continue to rotate, due in part to the action of the front-end accessory drive system 18, the outer race member 162 is incapable of transmitting a torque force, or any force for that matter, back to the inner race member 161, e.g., via the roller members 163.

When the engine 12 is shut off, for example when the automotive vehicle comes to a stop or is idling, the rotation of the outer race member 162 begins to slow with a concurrent decrease in the centrifugal force acting upon the roller members 163. Accordingly, the compressive force acting upon the biasable members 168 is decreased forcing the biasable members 168 to decompress, thus pushing or urging the rollers members 163 out of the depressions 162A towards the exterior surface of the inner race member 161. When the engine 12 is started again, e.g., the accelerator pedal is depressed; the clutch system 16 of the present invention is ready to engage again.

Accordingly, the primary effect of using the clutch system 16 and starter motor system 12 of the engine system 10 of the present invention in place of conventional starter systems is to preferably shorten the time required to start the engine and preferably reduce the noise generated by conventional "gear-type" starter systems. Another effect of using the clutch system 16 and starter motor system 12 of the engine system 10 of the present invention is to preferably improve fuel economy and preferably reduce emissions. These benefits are a result, in part, of stopping the engine each time the vehicle stops and restarting the engine when the accelerator pedal is depressed.

Figure 11:
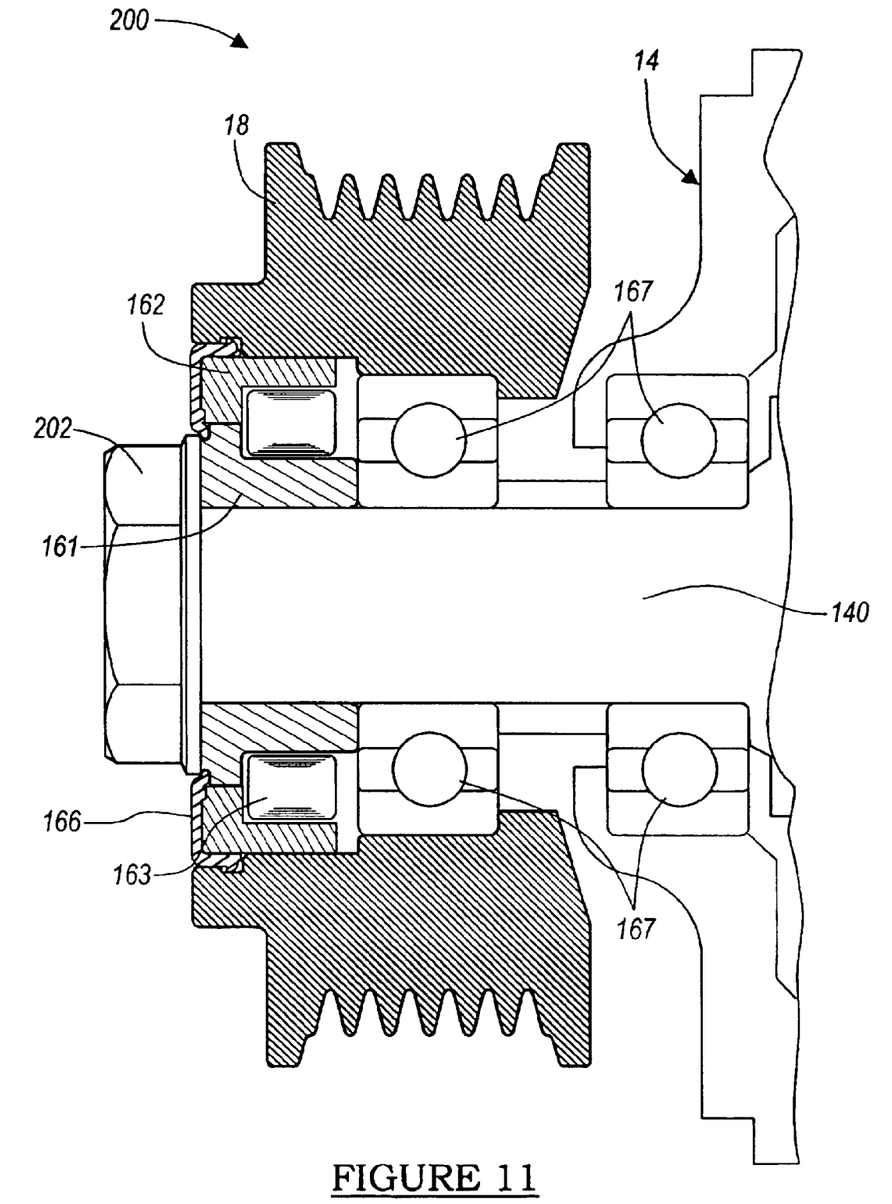
FIG. 11 illustrates a partial sectional view of an alternative clutch system, in accordance with an alternative embodiment of the present invention.

Referring generally to FIG. 11, an alternative embodiment of the present invention is shown, wherein the clutch system 200 is located outboard of the front-end accessory drive system 18. The clutch system 200 is similar in structure and function to the previously described clutch system 16. However, in this design, the inner race member 161 has been incorporated into a nut member 202 that holds the front-end accessory drive system 18 on the shaft member 140. Accordingly, the need to spline the shaft member 140 has been eliminated, as the inner race member 161 is locked onto the shaft member 140 by the threaded connection. In accordance with one embodiment of the present invention, the threads of the nut member 202 are preferably a left-hand design, thereby making the unit self-tightening during the engine start-up procedure.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A clutch system for use with a starter motor system having a selectively rotatable shaft member, comprising:

an inner race member being coaxially disposed about, and in selective physical cooperation with, the selectively rotatable shaft member, the inner race member being capable of rotating in response to a torque force transmitted from the selectively rotatable shaft member;

an outer race member being coaxially disposed about, and in selective physical cooperation with, the inner race member, the outer race member being capable of rotating in response to a torque force transmitted from the inner race member;

at least one roller member disposed between the inner and outer race members;

wherein the at least one roller member is selectively operable so as to physically engage at least a portion of a surface of the outer and inner race members so as to cause a torque force from the inner race member to be transmitted to the outer race member;

wherein the at least one roller member is selectively operable so as to physically disengage from at least a portion of the surface of the inner race member so as to prevent a torque force from the outer race member to be transmitted to the inner race member;

a selectively rotatable pulley drive system in physical cooperation with the outer race member, the outer race member is capable of transmitting a torque force to the pulley drive system so as to cause the pulley drive system to rotate; and a belt member in physical cooperation with the pulley drive system, the pulley drive system capable of transmitting a torque force to the belt member so as to cause the belt member to rotate;

wherein at least a portion of the clutch system is mounted to the starter motor system.

2. The invention according to claim 1, wherein the outer race member further includes at least one area defining a depression formed on an interior surface thereof.

3. The invention according to claim 2, wherein the depression includes a first portion and a second portion, wherein the second portion extends further towards an exterior surface of the outer race member than the first portion does.

4. The invention according to claim 3, further comprising at least one biasable member physically cooperating with at least a portion of a surface of the depression.

5. The invention according to claim 4, wherein the at least one biasable member physically cooperates with the second portion of the depression.

6. The invention according to claim 4, wherein the at least one roller member physically cooperates with the at least one biasable member.

7. The invention according to claim 6, wherein the at least one roller member is selectively operable to compress the at least one biasable member so as to cause the at least one roller member to physically disengage from at least a portion of the surface of the inner race member.

8. The invention according to claim 7, wherein the at least one roller member is selectively operable to travel from the first portion of the depression to the second portion of the depression in response to a centrifugal force being applied to the outer race member.

9. The invention according to claim 1, further comprising an engine having a selectively rotatable crankshaft member.

10. The invention according to claim 9, further comprising a selectively rotatable second pulley drive system in physical cooperation with the crankshaft member, the belt member in physical cooperation with the second pulley drive system, the belt member capable of transmitting a torque force to the second pulley drive system so as to cause the second pulley drive system to rotate.

11. The invention according to claim 10, further comprising at least one accessory system.

12. The invention according to claim 11, further comprising a selectively rotatable third pulley drive system in physical cooperation with the at least one accessory system, the belt member in physical cooperation with the third pulley drive system, the belt member capable of transmitting a torque force to the third pulley drive system so as to cause the third pulley drive system to rotate.

13. A clutch system for use with a starter motor system having a selectively rotatable shaft member, comprising:

an inner race member being coaxially disposed about, and in selective physical cooperation with, the selectively rotatable shaft member, the inner race member being capable of rotating in response to a torque force transmitted from the selectively rotatable shaft member;

an outer race member being coaxially disposed about, and in selective physical cooperation with, the inner race member, the outer race member being capable of rotating in response to a torque force transmitted from the inner race member;

at least one biasable member in physical cooperation with at least a surface of the outer race member;

at least one roller member disposed between the inner and outer race members, the at least one roller member in physical cooperation with the at least one biasable member;

wherein the at least one roller member is selectively operable so as to physically engage at least a portion of a surface of the outer and inner race members so as to cause a torque force from the inner race member to be transmitted to the outer race member;

wherein the at least one roller member is capable of transmitting a compressive force to the at least one biasable member so as to cause the at least one roller member to physically disengage from at least a portion of the surface of the inner race member so as to prevent a torque force from the outer race member to be transmitted to the inner race member;

a selectively rotatable pulley drive system in physical cooperation with the outer race member, the outer race member is capable of transmitting a torque force to the pulley drive system so as to cause the pulley drive system to rotate; and a belt member in physical cooperation with the pulley drive system, the pulley drive system capable of transmitting a torque force to the belt member so as to cause the belt member to rotate;

wherein at least a portion of the clutch system is mounted to the starter motor system.

14. The invention according to claim 13, wherein the outer race member further includes at least one area defining a depression formed on an interior surface thereof.

15. The invention according to claim 14, wherein the depression includes a first portion and a second portion, wherein the second portion extends further towards an exterior surface of the outer race member than the first portion does.

16. The invention according to claim 15, wherein the at least one biasable member physically cooperates with the second portion of the depression.

17. The invention according to claim 16, wherein the at least one roller member is selectively operable to travel from the first portion of the depression to the second portion of the depression in response to a centrifugal force being applied to the outer race member.

18. The invention according to claim 13, further comprising an engine having a selectively rotatable crankshaft member.

19. The invention according to claim 18, further comprising a selectively rotatable second pulley drive system in physical cooperation with the crankshaft member, the belt member in physical cooperation with the second pulley drive system, the belt member capable of transmitting a torque force to the second pulley drive system so as to cause the second pulley drive system to rotate.

20. The invention according to claim 19, further comprising at least one accessory system.

21. The invention according to claim 20, further comprising a selectively rotatable third pulley drive system in physical cooperation with the at least one accessory system, the belt member in physical cooperation with the third pulley drive system, the belt member capable of transmitting a torque force to the third pulley drive system so as to cause the third pulley drive system to rotate.

22. A clutch system for use with a starter motor system having a selectively rotatable shaft member, comprising:

an inner race member being coaxially disposed about, and in selective physical cooperation with, the selectively rotatable shaft member, the inner race member being capable of rotating in response to a torque force transmitted from the selectively rotatable shaft member;

an outer race member being coaxially disposed about, and in selective physical cooperation with, the inner race member, the outer race member being capable of rotating in response to a torque force transmitted from the inner race member, the outer race having at least one area defining a depression formed on an interior surface thereof;

at least one biasable member in physical cooperation with at least a portion of a surface of the depression;

at least one roller member disposed between the inner and outer race members, the at least one roller member in physical cooperation with the at least one biasable member;

wherein the at least one roller member is selectively operable so as to physically engage at least a portion of a surface of the outer and inner race members so as to cause a torque force from the inner race member to be transmitted to the outer race member;

wherein the at least one roller member is capable of transmitting a compressive force to the at least one biasable member so as to cause the at least one roller member to physically disengage from at least a portion of the surface of the inner race member so as to prevent a torque force from the outer race member to be transmitted to the inner race members;

a selectively rotatable pulley drive system in physical cooperation with the outer race member, the outer race member is capable of transmitting a torque force to the pulley drive system so as to cause the pulley drive system to rotate; and a belt member in physical cooperation with the pulley drive system, the pulley drive system capable of transmitting a torque force to the belt member so as to cause the belt member to rotate;

wherein at least a portion of the clutch system is mounted to the starter motor system.

23. The invention according to claim 22, wherein the depression includes a first portion and a second portion, wherein the second portion extends further towards an exterior surface of the outer race member than the first portion does.

24. The invention according to claim 23, wherein the at least one biasable member physically cooperates with the second portion of the depression.

25. The invention according to claim 24, wherein the at least one roller member is selectively operable to travel from the first portion of the depression to the second portion of the depression in response to a centrifugal force being applied to the outer race member.

26. The invention according to claim 22, further comprising an engine having a selectively rotatable crankshaft member.

27. The invention according to claim 26, further comprising a selectively rotatable second pulley drive system in physical cooperation with the crankshaft member, the belt member in physical cooperation with the second pulley drive system, the belt member capable of transmitting a torque force to the second pulley drive system so as to cause the second pulley drive system to rotate.

28. The invention according to claim 27, further comprising at least one accessory system.

29. The invention according to claim 28, further comprising a selectively rotatable third pulley drive system in physical cooperation with the at least one accessory system, the belt member in physical cooperation with the third pulley drive system, the belt member capable of transmitting a torque force to the third pulley drive system so as to cause the third pulley drive system to rotate.

30. A starter motor system, comprising:

a starter motor having a selectively rotatable shaft member; and a clutch system, comprising:

an inner race member being coaxially disposed about, and in selective physical cooperation with, the selectively rotatable shaft member, the inner race member being capable of rotating in response to a torque force transmitted from the selectively rotatable shaft member;

an outer race member being coaxially disposed about, and in selective physical cooperation with, the inner race member, the outer race member being capable of rotating in response to a torque force transmitted from the inner race member;

at least one roller member disposed between the inner and outer race members;

wherein the at least one roller member is selectively operable so as to physically engage at least a portion of a surface of the outer and inner race members so as to cause a torque force from the inner race member to be transmitted to the outer race member;

wherein the at least one roller member is selectively operable so as to physically disengage from at least a portion of the surface of the inner race member so as to prevent a torque force from the outer race member to be transmitted to the inner race member;

a selectively rotatable pulley drive system in physical cooperation with the outer race member, the outer race member is capable of transmitting a torque force to the pulley drive system so as to cause the pulley drive system to rotate; and a belt member in physical cooperation with the pulley drive system, the pulley drive system capable of transmitting a torque force to the belt member so as to cause the belt member to rotate;

wherein at least a portion of the clutch system is mounted to the starter motor.

31. The invention according to claim 30, wherein the outer race member further includes at least one area defining a depression formed on an interior surface thereof.

32. The invention according to claim 31, wherein the depression includes a first portion and a second portion, wherein the second portion extends further towards an exterior surface of the outer race member than the first portion does.

33. The invention according to claim 32, further comprising at least one biasable member physically cooperating with at least a portion of a surface of the depression.

34. The invention according to claim 33, wherein the at least one biasable member physically cooperates with the second portion of the depression.

35. The invention according to claim 33, wherein the at least one roller member physically cooperates with the at least one biasable member.

36. The invention according to claim 35, wherein the at least one roller member is selectively operable to compress the at least one biasable member so as to cause the at least one roller member to physically disengage from at least a portion of the surface of the inner race member.

37. The invention according to claim 36, wherein the at least one roller member is selectively operable to travel from the first portion of the depression to the second portion of the depression in response to a centrifugal force being applied to the outer race member.

38. The invention according to claim 30, further comprising an engine having a selectively rotatable crankshaft member.

39. The invention according to claim 38, further comprising a selectively rotatable second pulley drive system in physical cooperation with the crankshaft member, the belt member in physical cooperation with the second pulley drive system, the belt member capable of transmitting a torque force to the second pulley drive system so as to cause the second pulley drive system to rotate.

40. The invention according to claim 39, further comprising at least one accessory system.

41. The invention according to claim 40, further comprising a selectively rotatable third pulley drive system in physical cooperation with the at least one accessory system, the belt member in physical cooperation with the third pulley drive system, the belt member capable of transmitting a torque force to the third pulley drive system so as to cause the third pulley drive system to rotate.

42. A starter motor system, comprising:
a starter motor having a selectively rotatable shaft member; and
a clutch system, comprising:
an inner race member being coaxially disposed about, and in selective physical cooperation with, the selectively rotatable shaft member, the inner race member being capable of rotating in response to a torque force transmitted from the selectively rotatable shaft member;
an outer race member being coaxially disposed about, and in selective physical cooperation with, the inner race member, the outer race member being capable of rotating in response to a torque force transmitted from the inner race member;
at least one biasable member in physical cooperation with at least a surface of the outer race member;
at least one roller member disposed between the inner and outer race members, the at least one roller member in physical cooperation with the at least one biasable member;
wherein the at least one roller member is selectively operable so as to physically engage at least a portion of a surface of the outer and inner race members so as to cause a torque force from the inner race member to be transmitted to the outer race member;
wherein the at least one roller member is capable of transmitting a compressive force to the at least one biasable member so as to cause the at least one roller member to physically disengage from at least a portion of the surface of the inner race member so as to prevent a torque force from the outer race member to be transmitted to the inner race member;
a selectively rotataby pulley drive system in physical cooperation with the outer race member, the outer race member is capable of transmitting a torque force to the pulley drive system so as to cause the pulley drive system to rotate; and
a belt member in physical cooperation with the pulley drive system, the pulley drive system capable of transmitting a torque force to the belt member so as to cause the belt member to rotate;
wherein at least a portion of the clutch system is mounted to the starter motor.

43. The invention according to claim 42, wherein the outer race member further includes at least one area defining a depression formed on an interior surface thereof.

44. The invention according to claim 43, wherein the depression includes a first portion and a second portion, wherein the second portion extends further towards an exterior surface of the outer race member than the first portion does.

45. The invention according to claim 44, wherein the at least one biasable member physically cooperates with the second portion of the depression.

46. The invention according to claim 45, wherein the at least one roller member is selectively operable to travel from the first portion of the depression to the second portion of the depression in response to a centrifugal force being applied to the outer race member.

47. The invention according to claim 42, further comprising an engine having a selectively rotatable crankshaft member.

48. The invention according to claim 47, further comprising a selectively rotatable second pulley drive system in physical cooperation with the crankshaft member, the belt member in physical cooperation with the second pulley drive system, the belt member capable of transmitting a torque force to the second pulley drive system so as to cause the second pulley drive system to rotate.

49. The invention according to claim 48, further comprising at least one accessory system.

50. The invention according to claim 49, further comprising a selectively rotatable third pulley drive system in physical cooperation with the at least one accessory system, the belt member in physical cooperation with the third pulley drive system, the belt member capable of transmitting a torque force to the third pulley drive system so as to cause the third pulley drive system to rotate.

51. A starter motor system, comprising:
a starter motor having a selectively rotatable shaft member; and
a clutch system, comprising:
an inner race member being coaxially disposed about, and in selective physical cooperation with, the selectively rotatable shaft member, the inner race member being capable of rotating in response to a torque force transmitted from the selectively rotatable shaft member;
an outer race member being coaxially disposed about, and in selective physical cooperation with, the inner race member, the outer race member being capable of rotating in response to a torque force transmitted from the inner race member, the outer race having at least one area defining a depression formed on an interior surface thereof;
at least one biasable member in physical cooperation with at least a portion of a surface of the depression;
at least one roller member disposed between the inner and outer race members, the at least one roller member in physical cooperation with the at least one biasable member;
wherein the at least one roller member is selectively operable so as to physically engage at least a portion of a surface of the outer and inner race members so as to cause a torque force from the inner race member to be transmitted to the outer race member;
wherein the at least one roller member is capable of transmitting a compressive force to the at least one biasable member so as to cause the at least one roller member to physically disengage from at least a portion of the surface of the inner race member so as to prevent a torque force from the outer race member to be transmitted to the inner race member;

a selectively rotatable pulley drive system in physical cooperation with the outer race member, the outer race member is capable of transmitting a torque force to the pulley drive system so as to cause the pulley drive system to rotate; and a belt member in physical cooperation with the pulley drive system, the pulley drive system capable of transmitting a torque force to the belt member so as to cause the belt member to rotate;

wherein at least a portion of the clutch system is mounted to the starter motor.

52. The invention according to claim 51, wherein the depression includes a first portion and a second portion, wherein the second portion extends further towards an exterior surface of the outer race member than the first portion does.

53. The invention according to claim 52, wherein the at least one biasable member physically cooperates with the second portion of the depression.

54. The invention according to claim 53, wherein the at least one roller member is selectively operable to travel from the first portion of the depression to the second portion of the depression in response to a centrifugal force being applied to the outer race member.

55. The invention according to claim 51, further comprising an engine having a selectively rotatable crankshaft member.

56. The invention according to claim 55, further comprising a selectively rotatable second pulley drive system in physical cooperation with the crankshaft member, the belt member in physical cooperation with the second pulley drive system, the belt member capable of transmitting a torque force to the second pulley drive system so as to cause the second pulley drive system to rotate.

57. The invention according to claim 56, further comprising at least one accessory system.

58. The invention according to claim 57, further comprising a selectively rotatable third pulley drive system in physical cooperation with the at least one accessory system, the belt member in physical cooperation with the third pulley drive system, the belt member capable of transmitting a torque force to the third pulley drive system so as to cause the third pulley drive system to rotate.

59. An engine system, comprising:

an engine having a selectively rotatable crankshaft member;

a selectively rotatable pulley drive system in physical cooperation with the engine;

a belt member in physical cooperation with the pulley drive system, the pulley drive system capable of transmitting a torque force to the belt member so as to cause the crankshaft member to rotate;

a starter motor having a selectively rotatable shaft member; and a clutch system, comprising:

an inner race member being coaxially disposed about, and in selective physical cooperation with, the selectively rotatable shaft member, the inner race member being capable of rotating in response to a torque force transmitted from the selectively rotatable shaft member;

an outer race member being coaxially disposed about, and in selective physical cooperation with, the inner race member, the outer race member being capable of rotating in response to a torque force transmitted from the inner race member, the outer race member in physical cooperation with the pulley drive system, the outer race member capable of transmitting a torque force to the pulley drive system; and at least one roller member disposed between the inner and outer race members;

wherein the at least one roller member is selectively operable so as to physically engage at least a portion of a surface of the outer and inner race members so as to cause a torque force from the inner race member to be transmitted to the outer race member;

wherein the at least one roller member is selectively operable so as to physically disengage from at least a portion of the surface of the inner race member so as to prevent a torque force from the outer race member to be transmitted to the inner race member;

wherein at least a portion of the clutch system is mounted to the starter motor.

60. The invention according to claim 59, wherein the outer race member further includes at least one area defining a depression formed on an interior surface thereof.

61. The invention according to claim 60, wherein the depression includes a first portion and a second portion, wherein the second portion extends further towards an exterior surface of the outer race member than the first portion does.

62. The invention according to claim 61, further comprising at least one biasable member physically cooperating with at least a portion of a surface of the depression.

63. The invention according to claim 62, wherein the at least one biasable member physically cooperates with the second portion of the depression.

64. The invention according to claim 62, wherein the at least one roller member physically cooperates with the at least one biasable member.

65. The invention according to claim 64, wherein the at least one roller member is selectively operable to compress the at least one biasable member so as to cause the at least one roller member to physically disengage from at least a portion of the surface of the inner race member.

66. The invention according to claim 65, wherein the at least one roller member is selectively operable to travel from the first portion of the depression to the second portion of the depression in response to a centrifugal force being applied to the outer race member.

67. The invention according to claim 59, further comprising a second selectively rotatable pulley drive system in physical cooperation with the outer race member, the belt member in physical cooperation with the second pulley drive system, the outer race member is capable of transmitting a torque force to the second pulley drive system so as to cause the second pulley drive system to rotate.

68. The invention according to claim 67, further comprising at least one accessory system.

69. The invention according to claim 68, further comprising a selectively rotatable third pulley drive system in physical cooperation with the at least one accessory system, the belt member in physical cooperation with the third pulley drive system, the belt member capable of transmitting a torque force to the third pulley drive system so as to cause the third pulley drive system to rotate.

70. An engine system, comprising:

an engine having a selectively rotatable crankshaft member;

a selectively rotatable pulley drive system in physical cooperation with the engine;

a belt member in physical cooperation with the pulley drive system, the pulley drive system capable of transmitting a torque force to the belt member so as to cause the crankshaft member to rotate;

a starter motor having a selectively rotatable shaft member; and a clutch system, comprising;
  an inner race member being coaxially disposed about, and in selective physical cooperation with, the selectively rotatable shaft member, the inner race member being capable of rotating in response to a torque force transmitted from the selectively rotatable shaft member;
  an outer race member being coaxially disposed about, and in selective physical cooperation with, the inner race member, the outer race member being capable of rotating in response to a torque force transmitted from the inner race member, the outer race member in physical cooperation with the pulley drive system, the outer race member capable of transmitting a torque force to the pulley drive system;
  at least one biasable member in physical cooperation with at least a surface of the outer race member; and
  at least one roller member disposed between the inner and outer race members, the at least one roller member in physical cooperation with the at least one biasable member;
  wherein the at least one roller member is selectively operable so as to physically engage at least a portion of a surface of the outer and inner race members so as to cause a torque force from the inner race member to be transmitted to the outer race member;
  wherein the at least one roller member is capable of transmitting a compressive force to the at least one biasable member so as to cause the at least one roller member to physically disengage from at least a portion of the surface of the inner race member so as to prevent a torque force from the outer race member to be transmitted to the inner race member;
  wherein at least a portion of the clutch system is mounted to the starter motor.

71. The invention according to claim 70, wherein the outer race member further includes at least one area defining a depression formed on an interior surface thereof.

72. The invention according to claim 71, wherein the depression includes a first portion and a second portion, wherein the second portion extends further towards an exterior surface of the outer race member than the first portion does.

73. The invention according to claim 72, wherein the at least one roller member is selectively operable to travel from the first portion of the depression to the second portion of the depression in response to a centrifugal force being applied to the outer race member.

74. The invention according to claim 70, further comprising a second selectively rotatable pulley drive system in physical cooperation with the outer race member, the belt member in physical cooperation with the second pulley drive system, the outer race member is capable of transmitting a torque force to the second pulley drive system so as to cause the second pulley drive system to rotate.

75. The invention according to claim 74, further comprising at least one accessory system.

76. The invention according to claim 75, further comprising a selectively rotatable third pulley drive system in physical cooperation with the at least one accessory system, the belt member in physical cooperation with the third pulley drive system, the belt member capable of transmitting a torque force to the third pulley drive system so as to cause the third pulley drive system to rotate.

77. An engine system, comprising:

an engine having a selectively rotatable crankshaft member;

a selectively rotatable pulley drive system in physical cooperation with the engine;

a belt member in physical cooperation with the pulley drive system, the pulley drive system capable of transmitting a torque force to the belt member so as to cause the crankshaft member to rotate;

a starter motor having a selectively rotatable shaft member; and a clutch system, comprising:
  an inner race member being coaxially disposed about, and in selective physical cooperation with, the selectively rotatable shaft member, the inner race member being capable of rotating in response to a torque force transmitted from the selectively rotatable shaft member;
  an outer race member being coaxially disposed about, and in selective physical cooperation with, the inner race member, the outer race member being capable of rotating in response to a torque force transmitted from the inner race member, the outer race having at least one area defining a depression formed on an interior surface thereof, the outer race member in physical cooperation with the pulley drive system, the outer race member capable of transmitting a torque force to the pulley drive system;
  at least one biasable member in physical cooperation with at least a portion of a surface of the depression; and
  at least one roller member disposed between the inner and outer race members, the at least one roller member in physical cooperation with the at least one biasable member;
  wherein the at least one roller member is selectively operable so as to physically engage at least a portion of a surface of the outer and inner race members so as to cause a torque force from the inner race member to be transmitted to the outer race member;
  wherein the at least one roller member is capable of transmitting a compressive force to the at least one biasable member so as to cause the at least one roller member to physically disengage from at least a portion of the surface of the inner race member so as to prevent a torque force from the outer race member to be transmitted to the inner race member;
  wherein at least a portion of the clutch system is mounted to the starter motor.

78. The invention according to claim 77, wherein the depression includes a first portion and a second portion, wherein the second portion extends further towards an exterior surface of the outer race member than the first portion does.

79. The invention according to claim 78, wherein the at least one roller member is selectively operable to travel from the first portion of the depression to the second portion of the depression in response to a centrifugal force being applied to the outer race member.

80. The invention according to claim 77, further comprising a second selectively rotatable pulley drive system in physical cooperation with the outer race member, the belt member in physical cooperation with the second pulley drive system, the outer race member is capable of transmit ting a torque force to the second pulley drive system so as to cause the second pulley drive system to rotate.

81. The invention according to claim 80, further comprising at least one accessory system.

82. The invention according to claim 81, further comprising a selectively rotatable third pulley drive system in physical cooperation with the at least one accessory system, the belt member in physical cooperation with the third pulley drive system, the belt member capable of transmitting a torque force to the third pulley drive system so as to cause the third pulley drive system to rotate.

* * * * *

UNITED STATES PATENT AND TRADEMARK OFFICE
CERTIFICATE OF CORRECTION

PATENT NO. : 6,848,552 B2
DATED : February 1, 2005
INVENTOR(S) : John R. Miller

It is certified that error appears in the above-identified patent and that said Letters Patent is hereby corrected as shown below:

Column 15,
Line 28, "race members;" should be -- race member; --.

Column 17,
Line 54, "selectively rotataby" should be -- selectively rotatable --.

Column 21,
Line 5, "comprising;" should be -- comprising: --.

Column 22,
Line 67, "of transmit" should be -- of transmit- --.

Signed and Sealed this

Eleventh Day of October, 2005

JON W. DUDAS
*Director of the United States Patent and Trademark Office*